United States Patent [19]

Kiss et al.

[11] Patent Number: 4,578,212

[45] Date of Patent: Mar. 25, 1986

[54] LEAD ACTIVATED LUMINESCENT MATERIAL AND PROCESS FOR ITS PRODUCTION

[75] Inventors: Akos Kiss, Aschaffenburg; Peter Kleinschmit, Hanau; Werner Völker, Bad Vilbel; Günter Halbritter, Schöllkrippen, all of Fed. Rep. of Germany

[73] Assignee: Degussa Aktiengesellschaft, Frankfurt am Main, Fed. Rep. of Germany

[21] Appl. No.: 719,954

[22] Filed: Apr. 4, 1985

[30] Foreign Application Priority Data

Apr. 19, 1984 [DE] Fed. Rep. of Germany ....... 3414847

[51] Int. Cl.4 .............................................. C09K 11/36
[52] U.S. Cl. ................... 252/301.4 F; 501/23
[58] Field of Search ..................... 252/301.4 F; 501/23

[56] References Cited

U.S. PATENT DOCUMENTS

| | | | |
|---|---|---|---|
| 3,598,752 | 8/1971 | Sisneros et al. | 252/301.4 F |
| 3,859,102 | 1/1975 | Fearns et al. | 501/23 |
| 4,038,448 | 7/1977 | Boyd et al. | 501/23 X |
| 4,158,081 | 7/1979 | Wexell | 501/23 X |

FOREIGN PATENT DOCUMENTS

| | | | |
|---|---|---|---|
| 15382 | 9/1980 | European Pat. Off. | |
| 47-5098 | 2/1972 | Japan | 501/23 |

*Primary Examiner*—Jack Cooper
*Attorney, Agent, or Firm*—Cushman, Darby & Cushman

[57] ABSTRACT

There are described luminescent materials activated with lead upon excitation with long wave and short wave ultraviolet rays emit in the blue-green region, have long afterglow times, can be prepared from components which do not have high purity, are not susceptible to pulverizing, and are stable to the customary ceramic glazes. They consist of (or consist essentially of):

10 to 89.9 mole % zirconium oxide ($ZrO_2$)
5 to 85 mole % boron oxide ($B_2O_3$)
5 to 85 mole % silicon dioxide ($SiO_2$)
0.1 to 20 mole % lead oxide (PbO)
0 to 15 mole % sodium oxide ($Na_2O$)
0 to 15 mole % potassium oxide ($K_2O$) and
0 to 5 mole % aluminum oxide ($Al_2O_3$).

11 Claims, No Drawings

LEAD ACTIVATED LUMINESCENT MATERIAL AND PROCESS FOR ITS PRODUCTION

BACKGROUND OF THE INVENTION

The invention is directed to lead activated luminescent materials and a process for producing them.

Luminescent materials are solid substances which are capable of emitting light after absorbing energy (e.g. daylight, ultraviolet light, rontgen rays (X-rays) or corpuscular rays), which emitted light generally exhibits a greater wavelength than that of the absorbed ray. The light radiation occurs during the excitation itself and at various lengths of time thereafter, which can be from milliseconds to hours.

Luminescent materials find expanding use, such as for example, in lighting engineering to increase the energy yield in mercury lamps, in X-ray diagnostics, or in the coating of television tubes to make visible the modulated electron beam. Besides they are used as coatings for ceramic products, especially in glazes for ceramic tiles.

Only a few inorganic compounds are capable of luminescence. Generally, the luminescence capability is first acquired through an activation, for example, by building small amounts of ions (activators) foreign to the crystal lattice into the crystal lattice (host lattice) of the inorganic compound (base material). Therefore, in the activator containing luminescent materials, it is a matter of crystallized compounds in which a few cations of the base materials are replaced by foreign cations. The built-in cations with the surrounding band of anions thereby has been conceived as the so-called luminescent centers which are responsible for the characteristic absorptions and emissions.

As base materials for the luminescent materials of significance above all are salts of the alkaline earths and their side group elements zinc and cadmium such as phosphates, silicates, borates, aluminates and oxides. As activators there are preferably used the rare earths and heavy metals, such as manganese, lead, tin, or antimony.

The luminescent materials generally must be very pure and have a crystal lattice as free as possible from disturbances since impurities in the starting materials act as quench centers and reduce the luminescent intensity of the luminescent materials. Lattice defects act similarly. The luminescent capability is damaged in the mechanical comminution of the compounds and in the extreme case can be completely destroyed.

The previously known luminescent materials have the further disadvantage that most of them are not temperature stable and disintegrate in many fritted glasses. Therefore, they are not suitable as pigments in glazes for ceramic tiles which require firing temperatures of over 700° to 800° C.

There are only a few luminescent materials which emit in the blue-green region (nm 480 nm), those luminescent materials which have a long afterglow time in this region.

Luminescent materials activated with lead are relatively rare.

In essence, there are known only lead containing barium sulfate and lead containing alkaline earth silicates such as barium strontium magnesium silicate, barium disilicate or barium zinc silicate which have emission bands in the regions of 300 to 370 nm. As with all previously known luminescent materials, they must be produced from highly pure starting materials by solid body reactions at 1150° to 1200° C. Besides the products are sensitive to grinding and not stable against many ceramic glazes.

Therefore, it was the problem of the present invention to develop lead activated luminescent materials which emit in the blue-green region, are excitable with both long wave (366 nm) and also with a short wave (254 nm) ultraviolet light, have afterglow times in the seconds to minutes region, can be produced from materials which are not highly purified and are resistant to customary ceramic glazes. Besides there should be found a process for the production of these luminescent materials.

SUMMARY OF THE INVENTION

This problem was solved according to the invention by providing a luminescent material which consists of (or consists essentially of):

10 to 89.9 mole % zirconium oxide ($ZrO_2$)
5 to 85 mole % boron oxide ($B_2O_3$)
5 to 85 mole % silicon dioxide ($SiO_2$)
0.1 to 20 mole % lead oxide (PbO)
0 to 15 mole % sodium oxide ($Na_2O$)
0 to 15 mole % potassium oxide ($K_2O$) and
0 to 5 mole % aluminum oxide ($Al_2O_3$).

These luminescent materials are substantially insensitive to grinding, temperature stable and capable of resistance against most ceramic glazes.

They are excitable with both long wave (366 nm) and short wave UV and have an emission band at about 480 nm in the blue-green region. Their afterglow duration is in the range of seconds to minutes.

Preferably, the luminescent material contains:

10 to 60 mole % zirconium oxide ($ZrO_2$)
10 to 60 mole % boron oxide ($B_2O_3$)
10 to 60 mole % silicon dioxide ($SiO_2$) and
0.5 to 10 mole % lead oxide (PbO).

There have proven especially good luminescent materials which contain:

40 to 55 mole % zirconium dioxide ($ZrO_2$)
25 to 35 mole % boron oxide ($B_2O_3$)
15 to 20 mole % silicon oxide ($SiO_2$) and
0.5 to 2 mole % lead oxide (PbO).

These luminescent materials can be produced from commercial materials of a not highly pure quality without noticeably losing luminescent strength.

By the addition of alkali (e.g. sodium or potassium) and aluminum oxides, there can be produced from these luminescent materials a glass-like composition which likewise has the luminescent character and can be worked to an afterglowing glass frit, which is outstandingly suitable as luminescent glaze for ceramic products.

Such glazes preferably consist of:

10 to 60 mole % zirconium oxide ($ZrO_2$)
5 to 30 mole % boron oxide ($B_2O_3$)
10 to 80 mole % silicon dioxide ($SiO_2$)
0.1 to 10 mole % lead oxide (PbO)
2 to 15 mole % sodium oxide ($Na_2O$)
2 to 15 mole % potassium oxide ($K_2O$) and
0.5 to 5 mole % aluminum oxide ($Al_2O_3$).

There has proven especially good luminescent material frits of the following composition:

15 to 30 mole % zirconium oxide ($ZrO_2$)
5 to 15 mole % boron oxide ($B_2O_3$)
40 to 65 mole % silicon dioxide ($SiO_2$)
0.5 to 3 mole % lead oxide (PbO)

5 to 10 mole % sodium oxide ($Na_2O$)
5 to 10 mole % potassium oxide ($K_2O$) and
1 to 3 mole % aluminum oxide ($Al_2O_3$).

To produce the luminescent materials of the invention, there are intensively mixed and comminuted commercial starting materials in the form of oxides or in the form of oxide forming compounds such as zirconium oxide, boric acid, silica, red lead, and in a given case, rasorite, potassium carbonate and kaolin in the corresponding molar ratios, then the mixture lightly pressed and calcined in a solid body reaction at 700° to 1500° C. for 0.1 to 6 hours in the air.

Preferably for producing crystalline luminescent materials, calcining is at 1000° to 1200° C., for the production of luminescent frits, calcining is at 1250° to 1450° C.

The composition can consist of or consist essentially of the stated materials.

DETAILED DESCRIPTION

For example, there were comminuted 111.3 grams of zirconium oxide, 66.8 grams of boric acid, 15.8 grams of silica and 6.1 grams of red lead were intensively mixed for 15 minutes and comminuted. The mixture was compressed in a ceramic crucible and calcined in a furnace at 1080° C. for 1 hour. The thus produced luminescent material is temperature stable and does not lose significant luminescence by grinding and pressing.

The following luminescent materials were produced according to this process.

| $ZrO_2$ [Mole %] | $B_2O_3$ [Mole %] | $SiO_2$ [Mole %] | PbO [Mole %] |
|---|---|---|---|
| 85.1 | 7.0 | 6.2 | 1.7 |
| 61.6 | 18.7 | 19.1 | 0.6 |
| 42.5 | 26.0 | 30.3 | 1.2 |
| 32.6 | 17.4 | 48.2 | 1.8 |
| 10.2 | 5.5 | 82.4 | 1.9 |
| 10.1 | 46.5 | 41.9 | 1.5 |
| 10.2 | 81.2 | 7.5 | 1.1 |
| 42.8 | 25.9 | 15.1 | 16.2 |
| 46.4 | 31.8 | 16.4 | 5.4 |
| 19.4 | 17.2 | 61.4 | 2.0 |

In order to produce luminescent frits, the powder mixture which additionally contains alkali (e.g. sodium or potassium) and aluminum oxides or alkali compounds such as the carbonates which are converted into the oxide form in the calcining are calcined at temperatures at which the mixture melts. There are obtained very viscous compositions which are very well suited for the preparation of glazes.

The following luminescent glazes were produced according to this process:

| $ZrO_2$ [Mole %] | $B_2O_3$ [Mole %] | $SiO_2$ [Mole %] | PbO [Mole %] | $Na_2O$ [Mole %] | $K_2O$ [Mole %] | $Al_2O$ [Mole %] |
|---|---|---|---|---|---|---|
| 25.2 | 28.1 | 25.9 | 1.5 | 2.8 | 13.0 | 3.5 |
| 40.2 | 21.0 | 12.1 | 6.5 | 14.1 | 1.6 | 4.5 |
| 57.4 | 5.8 | 15.6 | 8.4 | 5.1 | 5.4 | 2.3 |
| 10.2 | 5.1 | 74.9 | 0.5 | 4.6 | 3.2 | 1.5 |
| 18.1 | 7.7 | 62.6 | 1.0 | 4.1 | 5.0 | 1.5 |

What is claimed is:
1. A lead activated luminescent material consisting essentially of:
   10 to 89.9 mole % zirconium oxide ($ZrO_2$)
   5 to 85 mole % boron oxide ($B_2O_3$)
   5 to 85 mole % silicon dioxide ($SiO_2$)
   0.1 to 20 mole % lead oxide (PbO)
   0 to 15 mole % sodium oxide ($Na_2O$)
   0 to 15 mole % potassium oxide ($K_2O$) and
   0 to 5 mole % aluminum oxide ($Al_2O_3$),
and exhibiting an emission band at about 480 nm when excited by 366 nm or 254 nm radiation.

2. A lead activated luminescent material consisting of the composition of claim 1.

3. A lead activated luminescent material according to claim 1 consisting essentially of:
   10 to 60 mole % zirconium oxide ($ZrO_2$)
   10 to 60 mole % boron oxide ($B_2O_3$)
   10 to 60 mole % silicon dioxide ($SiO_2$) and
   0.5 to 10 mole % lead oxide (PbO).

4. A lead activated luminescent material according to claim 1 consisting essentially of:
   40 to 55 mole % zirconium dioxide ($ZrO_2$)
   25 to 35 mole % boron oxide ($B_2O_3$)
   15 to 20 mole % silicon oxide ($SiO_2$) and
   0.5 to 2 mole % lead oxide (PbO).

5. A lead activated luminescent material according to claim 1 consisting essentially of:
   10 to 60 mole % zirconium oxide ($ZrO_2$)
   5 to 30 mole % boron oxide ($B_2O_3$)
   10 to 80 mole % silicon dioxide ($SiO_2$)
   0.1 to 10 mole % lead oxide (PbO)
   2 to 15 mole % sodium oxide ($Na_2O$)
   2 to 15 mole % potassium oxide ($K_2O$) and
   0.5 to 5 mole % aluminum oxide ($Al_2O_3$).

6. A lead activated luminescent material according to claim 1 consisting essentially of:
   15 to 30 mole % zirconium oxide ($ZrO_2$)
   5 to 15 mole % boron oxide ($B_2O_3$)
   40 to 65 mole % silicon dioxide ($SiO_2$)
   0.5 to 3 mole % lead oxide (PbO)
   5 to 10 mole % sodium oxide ($Na_2O$)
   5 to 10 mole % potassium oxide ($K_2O$) and
   1 to 3 mole % aluminum oxide ($Al_2O_3$).

7. A process of forming a luminescent material according to claim 1 comprising mixing and comminuting starting materials in the corresponding molar ratios and in the form of oxides or in the form of compounds which are converted into oxides under the conditions employed, then pressing the comminuted materials and calcining the pressed materials in air in a solid body reaction at 700° to 1500° C. for 0.5 to 16 hours.

8. A process according to claim 7 carried out in the absence of sodium oxide, potassium oxide, and aluminum oxide.

9. A process according to claim 8 carried out at 1000° to 1200° C.

10. A process according to claim 7 carried out in the presence of sufficient sodium oxide, potassium oxide, and aluminum oxide to produce a luminescent frit.

11. A process according to claim 10 carried out at 1250° to 1450° C.

* * * * *